United States Patent [19]

Küpper

[11] 4,453,510

[45] Jun. 12, 1984

[54] RECIPROCATING PISTON INTERNAL COMBUSTION ENGINE

[75] Inventor: Heinz Küpper, Troisdorf-Sieglar, Fed. Rep. of Germany

[73] Assignee: Klöckner-Humboldt-Deutz Aktiengesellschaft, Cologne, Fed. Rep. of Germany

[21] Appl. No.: 529,553

[22] Filed: Sep. 6, 1983

[30] Foreign Application Priority Data

Oct. 1, 1982 [DE] Fed. Rep. of Germany ....... 3236404

[51] Int. Cl.³ .............................................. F01M 1/00
[52] U.S. Cl. .......................... 123/196 AB; 123/73 A; 123/196 R; 184/6.21; 184/6.24
[58] Field of Search ...... 123/196 R, 196 AB, 73 AD; 184/6.21, 6.24

[56] References Cited

U.S. PATENT DOCUMENTS 3,707,955 1/1973 Ulbing ........................... 123/73 AB Primary Examiner—Ronald B. Cox
Assistant Examiner—E. Rollins Cross
Attorney, Agent, or Firm—Becker & Becker, Inc.

[57] ABSTRACT

A reciprocating piston internal combustion engine having an intake air system, an exhaust gas system, and an injection pump. To lubricate the injection pump, the latter can communicate with the lubricating-oil system of the internal combustion engine; the injection pump conveys a fuel having a low boiling point. A vaporizer is provided, the input side of which can communicate with the lubricating-oil return line of the injection pump, and the output side of which can communicate with the lubricating-oil system of the internal combustion engine and with the intake air system. The vaporizer serves for purifying the lubricating oil of fuel constituents which have a low boiling point and which contaminated the lubricating oil as a result of unavoidable leakages within the injection pump.

7 Claims, 2 Drawing Figures

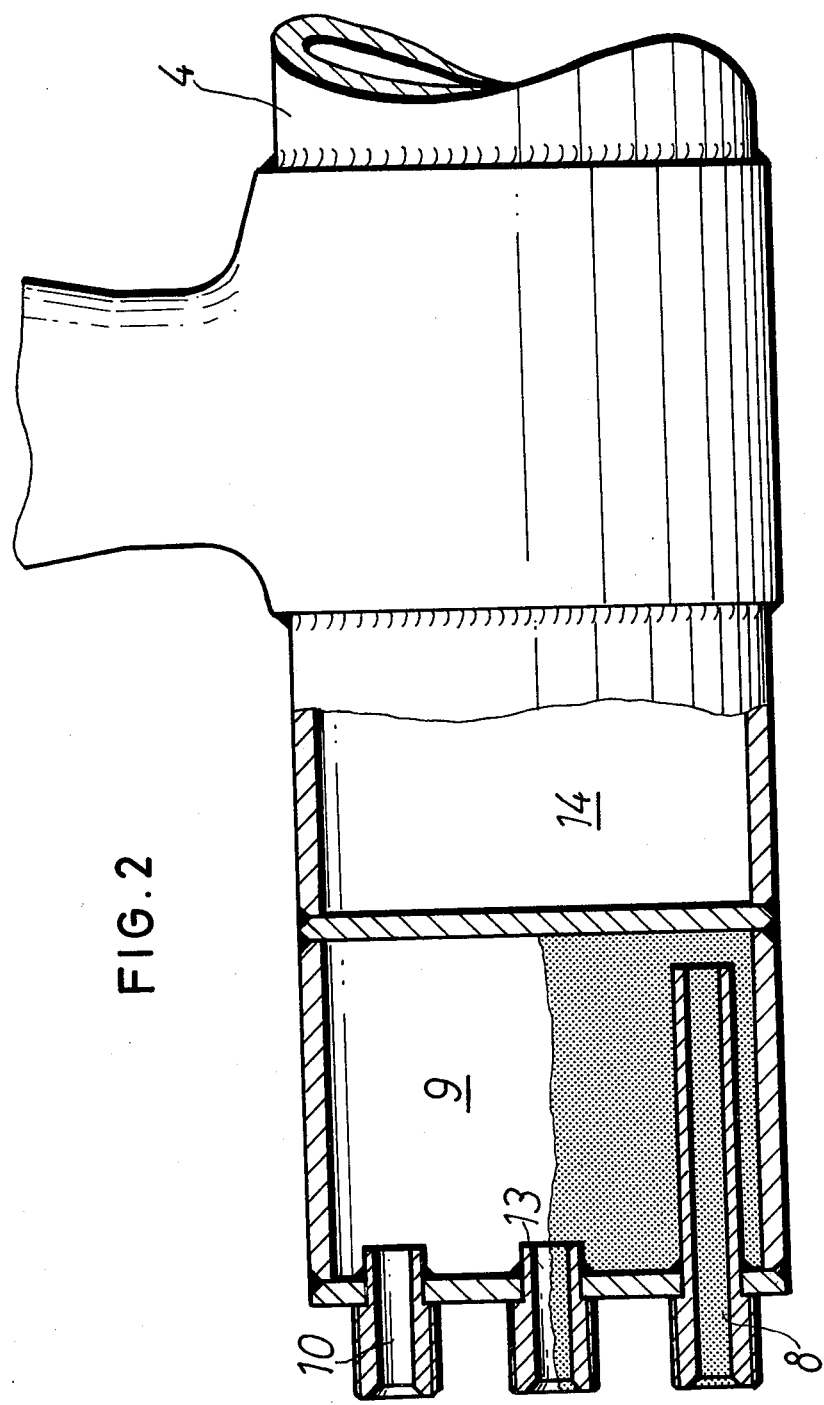

RECIPROCATING PISTON INTERNAL COMBUSTION ENGINE

BACKGROUND OF THE INVENTION

The present invention relates to a reciprocating piston internal combustion engine having an intake air system and an exhaust gas system, and a fuel injection arrangement comprising at least one injection pump and one injection nozzle; to lubricate the injection pump, lubricating oil can be withdrawn from the internal combustion engine and can be returned to the lubricating-oil system thereof by means of a lubricating-oil return line.

Reciprocating piston internal combustion engines having this general type of arrangement are known, and are conventionally operated with Diesel fuel. However, due to the shortage of oil and the cost thereof, which can be expected to increase still further, fuels which can be synthetically produced, and other alternative fuels, are constantly gaining significance in the operation of internal combustion engines. Furthermore, these fuels also have the advantage of the considerably improved exhaust gas quality in contrast to the internal combusiton engines operated with Diesel fuel. Fuels which can be synthetically produced, or other alternative fuels, especially alcohols such as methanol which have a low boiling point, can be used in varying ways in a completely satisfactory manner in reciprocating piston internal combustion engines having a conventional construction for the aforementioned general type of construction. Thus it has, for example, been proposed to inject methanol via the conventional injection device, and to inject, for example, Diesel fuel via an additional injection device (U.S. Pat. No. 4,368,702, which belongs to the Assignee of the present application). It has also been proposed to provide a special spark plug or glow plug on the internal combustion engine, and to likewise inject methanol via the conventional injection device (East German Patent No. 39 916).

However, when such reciprocating piston internal combustion engines are operated with fuels which have a low boiling point, they encounter the common drawback that the injection pump for injecting the fuel having a low boiling point is connected for lubrication to the lubricating-oil system of the internal combustion engine, as a result of which, due to the unavoidable leakages at the injection pump element, fuel having a low boiling point passes into the lubricating-oil system of the internal combustion engine; due to the prevailing temperatures, especially in the crankcase of the internal combustion engine, the fuel forms an ignitible mixture with the air that exists there. This results in the danger of explosions in the crankcase.

It is therefore an object of the present invention to further develop a reciprocating piston internal combusion engine of the aforementioned general type, while maintaining the advantageous lubricating-oil supply of the injection pump with lubricating oil from the internal combustion engine, in such a way that during operation of the latter with fuel having a low boiling point, the danger of explosions in the crankcase is precluded.

BRIEF DESCRIPTION OF THE DRAWINGS

This object, and other objects and advantages of the present invention, will appear more clearly from the following specification in conjunction with the accompanying drawings, in which:

FIG. 2 is a section through one embodiment of the inventive vaporizer which is provided on the exhaust gas system of a reciprocating piston internal combustion engine.

SUMMARY OF THE INVENTION

Figure 1:
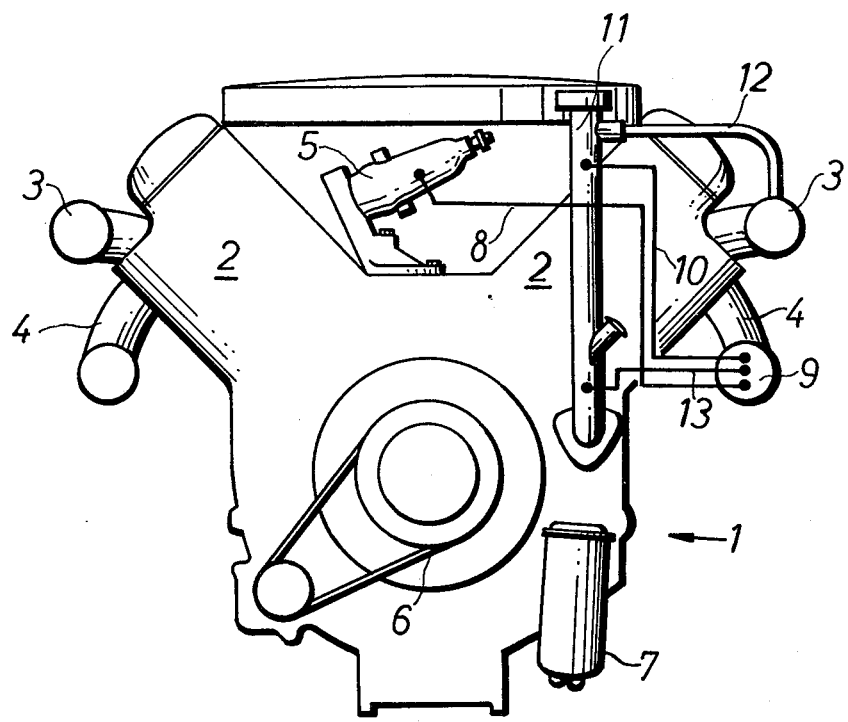
FIG. 1 is a schematic front view of a reciprocating piston internal combustion engine which is equipped with one embodiment of the inventive vaporizer.

The internal combustion engine of the present invention is characterized primarily by a vaporizer, the intake side of which can communicate with the lubricating-oil return line of the injection pump, and the output side of which can communicate with the lubricating-oil system of the internal combustion engine and with the intake air system thereof.

Due to the vaporizer provided pursuant to the present invention, the lubricating oil of the internal combustion engine can be kept nearly free of fuel constituents having a low boiling point, so that an explosion of the crankcase or of other structural parts of the internal combustion engine is precluded. The leakage fuel having a low boiling point in the lubricating oil of the injection pump is completely vaporized in the vaporizer and is conveyed via the intake air system of the internal cumbustion engine for further combustion. The vaporizer is a structural part which is simple and economical to manufacture, and which can be simply yet effectively mounted on any reciprocating piston internal combustion engine which is to be operated with fuel having a low boiling point. In this connection, it is completely immaterial what further special features the internal combustion engine has, for example for operation with an alternative fuel, i.e. whether, for example, an ignition-ray injection device or an injection source are provided. The effectiveness and the exhibited advantages of the vaporizer apply in all cases without restriction.

The connection of the output side of the vaporizer with the lubricating-oil system and the intake air system is effected pursuant to a preferred embodiment of the present invention by means of a crankcase breathing pipe of the internal combustion engine; this represents a simple solution which does not require much installation.

The exhaust gas of the internal combustion engine is preferably used as the heat carrier of the vaporizer, so that a further additional heat source for heating the vaporizer can be dispensed with. However, it is also possible to use another suitable heat carrier medium for heating the vaporizer, which other medium is available in the operation of the internal combustion engine at a sufficient temperature level. An example of such a medium is lubricating oil which can be drawn off at a suitable location.

Pursuant to further specific embodiments of the present invention, it is proposed that the vaporizer be mounted on the exhaust gas system of the internal combustion engine, and that the exhaust gas system and the vaporizer be integrally embodied. In so doing, it is advantageously possible to mount the vaporizer on the internal combustion engine in a very space-saving manner; furthermore, it is possible to produce the vaporizer as a compact structural unit in a simple and economical manner by extending the already existing exhaust gas system.

It is also proposed to provide a closed-off air space between the exhaust gas system and the vaporizer in order to avoid overheating the lubricating oil in the vaporizer. This measure can also be structurally realized in a simple manner by extending the existing exhaust gas system of the internal combustion engine by two corresponding spaces, with the air space volume being optimized in conformity to the permissible lubricating-oil temperatures and the necessary vaporization temperatures.

Pursuant to yet another specific embodiment of the present invention, it is proposed that the connection of the output side of the vaporizer to the intake air system be heat insulated in order to prevent condensation of the fuel vapors. This embodiment is particularly significant if, as previously proposed, the connection of the output side of the vaporizer to the lubricating-oil system of the internal combustion engine and to the intake air system is effected via the crankcase breather pipe of the internal combustion engine and therefore condensed fuel could pass via the crankcase breather pipe into the lubricating-oil system of the internal combustion engine.

DESCRIPTION OF PREFERRED EMBODIMENTS

Referring now to the drawings in detail, FIG. 1 illustrates a schematic front view of a reciprocating piston internal combustion engine 1. The cylinder rows 2 are arranged in a V-shape; functionally associated with each cylinder row 2 is an intake air system 3 and an exhaust gas system 4. Also provided is an injection pump 5, an accessory drive 6, and an oil filter 7. A fuel having a low boiling point, especially methanol, is conveyed via the injection pump 5. It is also possible to provide further features, which are not illustrated in detail, for the operation of the reciprocating piston internal combustion engine 1 with a fuel having a low boiling point; examples of such features are an ignition-ray injection device, or a spark plug or glow plug. For lubricating the injection pump, the latter, again in a manner not illustrated in detail, is connected to the lubricating-oil system of the reciprocating piston internal combustion engine 1, so that, due to unavoidable leakages in the injection pump 5, the danger exists that fuel having a low boiling point passes into the lubricating-oil system of the reciprocating piston internal combustion engine 1. Therefore, a vaporizer 9 is provided in the lubricating-oil return line 8 of the injection pump 5. The vaporizer 9 is heated with exhaust gas from the engine, and is provided directly on one of the exhaust gas systems 4 of the engine 1. The lubricating oil of the injection pump 5 contaminated with fuel having a low boiling point is conveyed via the lubricating-oil return line 8 to the vaporizer 9, in which the fuel constituents which have a low boiling point are separated or liberated in the form of vapor. The fuel vapors are conveyed via a line 10 to the crankcase breather pipe 11 of the engine 1, and, via a line 12, reach the intake air system 3, by means of which they are supplied for further combustion. The line 12, and possibly also the line 8 and the crankcase breather pipe 11, can be heat insulated in order to reliably preclude condensation of the fuel vapors. The lubricating oil in the vaporizer 9 has been completely purified of fuel having a low boiling point and returns via an oil-return line 13 and the crankcase breather pipe 11 into the lubricating-oil system of the reciprocating internal combustion engine 1.

FIG. 2 is a section through the vaporizer 9, which is provided on one of the exhaust gas systems 4 of the engine 1. The vaporizer 9 is adapted to the geometry of the exhaust gas system 4, and is integrally embodied therewith. Between the exhaust gas system 4 and the vaporizer 9 is provided a closed-off air space 14, the volume of which is optimized with regard to heat transfer in conformity with the permissible lubricating-oil temperatures and the necessary vaporization temperatures. With regard to manufacture, this construction is easy to realize since an already existing exhaust gas system must only be extended in an advantageous manner by two chambers, for example by welding. Due to the round cross section of the vaporizer 9, in this exemplary embodiment the oil-return line 13 is expediently provided in the middle of the cross section of the vaporizer 9 in order to obtain a maximum vaporizing surface.

The present invention is, of course, in no way restricted to the specific disclosure of the specification and drawings, but also encompasses any modifications within the scope of the appended claims.

What I claim is:

1. A reciprocating piston combustion engine which includes an intake air system, an exhaust gas system, a lubricating-oil system, and a fuel injection arrangement which includes at least one injection pump and one injection nozzle; to provide lubrication for said at least one injection pump, lubricating oil can be withdrawn from said lubricating-oil system of said internal combustion engine and can be returned thereto via a lubricating-oil return line; the improvement comprises:
   a vaporizer disposed in said lubricating-oil return line; said vaporizer having an intake side which can communicate with said at least one injection pump via said lubricating-oil return line, and an output side which can communicate with said lubricating-oil system of said internal combustion engine via said lubricating-oil return line, and can also communicate with said intake air system.

2. An internal combustion engine according to claim 1, which includes a crankcase breather pipe for effecting said communication of said output side of said vaporizer with said lubricating-oil system and with said intake air system.

3. An internal combustion engine according to claim 1, in which said vaporizer is adapted to be heated with exhaust gas from said internal combustion engine.

4. An internal combustion engine according to claim 3, in which said vaporizer is associated with said exhaust gas system of said internal combustion engine.

5. An internal combustion engine according to claim 4, in which said vaporizer and said exhaust gas system are integrally embodied.

6. An internal combustion engine according to claim 4, in which a closed-off chamber in the form of an air space is disposed between said exhaust gas system and said vaporizer.

7. An internal combustion engine according to claim 1, in which heat insulation is provided for said communication of said output side of said vaporizer with said intake air system.

* * * * *